3,385,750
LAMINATED FABRIC FOR UPHOLSTERY AND THE LIKE

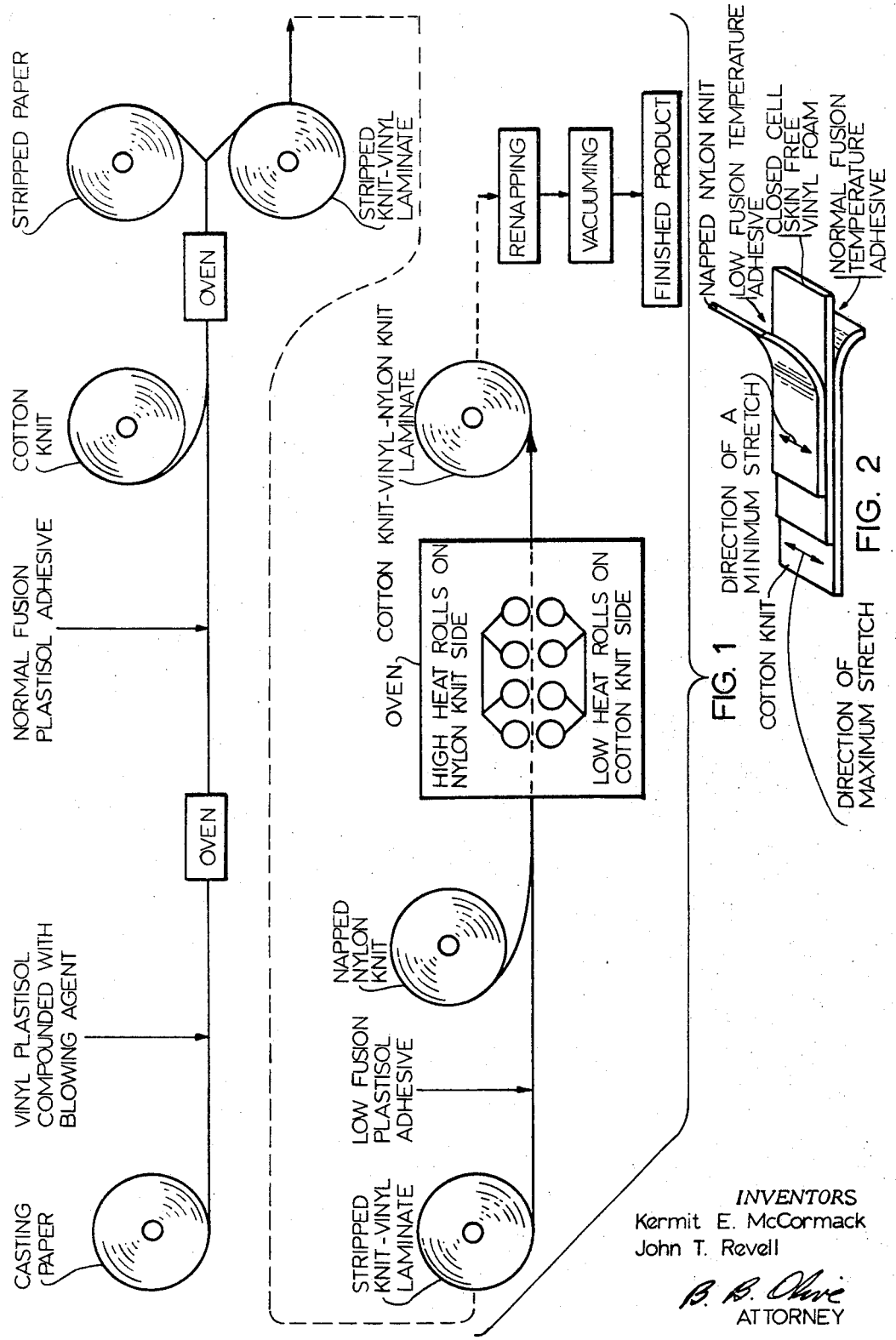

Kermit E. McCormack, Durham, and John T. Revell, Raleigh, N.C., assignors to Plymouth Cordage Industries, Inc., Boston, Mass., a corporation of Massachusetts
Filed Dec. 27, 1965, Ser. No. 516,530
1 Claim. (Cl. 161—64)

ABSTRACT OF THE DISCLOSURE

A laminated fabric suited to tailored upholstery applications comprises a polyvinyl chloride foam sheet bonded by plastisol adhesives to cotton knit and tricot knit fabrics, the character of the adhesives and fabrics enabling the laminate to be made on a continuous production basis and in the finished fabric to exhibit both dimensional stability and washability.

---

One of the most widely used automobile and furniture upholstery fabrics is composed of a plasticized polyvinyl chloride resin sheet bonded to a plain cotton knit fabric. Such a fabric has found favor because it is economical to use and is reasonably durable in service. The exposed vinyl can be given various colors and grain effects. However, such a fabric lacks a desirable "hand" as such term is employed in the trade. Such fabric also lacks sufficient strength for the more stringent applications such as in automobile seat covers and in many instances the dimensional stability of the fabric is below that required for the application. For example, furniture and automobile seat covers which are used frequently by persons of heavy weight tend not to recover when stretched and become wrinkled when made of the commonly used vinyl and cotton knit laminate. Cleaning and tailoring are further problems.

An object of the present invention therefore is to provide a laminated fabric which can be made substantially as cheap and as attractive as the commonly used vinyl-cotton knit laminate.

Another object is to provide a laminated fabric which exhibits qualities of good hand, high strength, abrasive resistance, water-proofness, cleanability, tailorability and a high degree of dimensional stability.

Another object is to provide an improved laminated upholstery fabric which can be made with readily available materials and equipment.

The foregoing and other objects of the invention will appear from the description which follows and the drawings, in which:

FIGURE 1 is a process flow chart illustrating manufacture of the fabric of the invention.

FIGURE 2 is a perspective of the fabric of the invention with portions of the fabric being separated for purposes of illustration.

To understand the present invention, there is illustrated in FIGURE 1 a preferred process of manufacture in which the first steps of the illustrated process are directed to the steps involved in making the conventional cotton knit-vinyl laminate. The final steps of the illustrated process are directed to the added steps which are necessary to achieve, and which characterize, the fabric of the invention. FIGURE 2 illustrates the final product.

In reference to FIGURE 1, a suitable width casting paper, 58 inch being a common size, receives a coat of vinyl plastisol, polyvinyl chloride, compounded with a suitable blowing agent such as azobisformamide. A plastisol flow rate of 10½ ounces on the 58 inch width per yard length of casting paper is typical. The coated casting paper is next exposed to heat sufficient to gell the vinyl plastisol on the paper. The gelled plastisol is next coated with a conventional plastisol adhesive dispersion at room temperature and at a rate of 4½ ounces per yard length of casting paper. The adhesive employed conventionally has a fusion temperature of 310° F. to 350° F. as measured in the mass. "Fusion temperature" is generally that temperature at which the resin dissolves in the plasticizer. It is more precisely defined in various trade publications well known to the art. As the gelled plastisol bearing the adhesive moves along in the process a layer of cotton plain knit fabric is laminated to the vinyl preferably with the wales running lengthwise of the casting paper and the courses running laterally. Such a fabric tends to stretch substantially more in the coursewise than in the walewise direction. The exact structure of the cotton knit fabric may vary but a desired structure comprises a plain knit cotton fabric of weight 2.4 ounces per square yard, 29 wales per inch, 25 courses per inch and yarn size 28 inches to 30 inches.

The cotton knit fabric and plastisol adhesive are contacted at normal room temperature but are next passed through an oven where the mass temperature of the vinyl is brought to 350° F., the vinyl being fused and the blowing agent being released to form a skin free, closed cell, vinyl foam after which the laminated cotton knit-vinyl is stripped from the casting paper and is wound for the further steps which produce and charactrize the fabric of the invention. The foam should have a density of 18 to 30 pounds per cubic foot density with 25 pounds per cubic foot being preferred. Below 18 pounds density it has been found that the foam lacks the heat resistance required to achieve the product of the invention, i.e., the foam will collapse at the temperature necessary for fusion of the adhesive during lamination of the nylon knit, the tricot, to the foam. Above 30 pounds density the final fabric is given a harsh and stiff "hand."

The final composite fabric of the invention comprises a napped, nylon knit fabric laminated to the described cotton knit-vinyl laminate in the manner next to be described. A napped, nylon, tricot fabric has been found suited for the purpose. The practice in the art would tend to indicate that a laminated fabric of the kind represented by the invention could not be made practical because of the possibility of collapsing the vinyl foam by reason of the heat required to fuse the tricot adhesive to the point that the resin dissolves in the plasticizer. The practice in the art would also indicate the possibility of melting the nylon foaming the tricot side of the laminate by reason of the heat that would have to be applied to make the desired fabric. The shrink factor of the nylon would also deter those who practice in the art to question the possibility of obtaining the fabric of the invention which has nevertheless been achieved in a practical, commercial sense.

Referring back to FIGURE 1 and the final steps of the process which characterize the fabric of the invention, a specially selected plastisol adhesive having a relatively low fusion temperature compared to the previously mentioned cotton knit adhesive is applied to the vinyl side of the cotton knit-vinyl laminate. This last adhesive is selected to fuse at a relatively low temperature in the range of 250° F. to 280° F., 260° F. being typical. A high ratio of parts plasticizer to resin in the range of 90 to 125 parts plasticizer to resin is selected to get the correct viscosity character and fusion temperature in the adhesive. After receiving a coat of the described low fusion plastisol adhesive on the vinyl side of the cotton knit-vinyl laminate, a layer of napped tricot fabric of the same width as the cotton knit-vinyl and of suitable color is fed so as to be applied against the previously applied low fusion adhesive with the napped side of the tricot exposed. A preferred tricot fabric which has been found to give the desired qualities is made with a standard tricot, double bar, stitch of what is known in the trade as Antron type 66 nylon in a weight range of about 4 to 6 ounces per square yard, 4.65 ounce weight being preferred, and which is heat set at 390° F. to 400° F. and the tricot is applied so that its wales run longitudinally of the laminate. The tricot should be permetallized acid dyed nylon and should have a minimum ultimate elongation in the course direction of 70 percent by the Federal G.S.A specification CCC–T–101–b, Method 5100. Permetallized acid dyeing gives a desired light, wash and crock fastness and has also been found to be compatible with the other process and product requirements of the invention. By providing the coursewise stretch indicated the final fabric of the invention is made to exhibit excellent tailoring characteristics.

The composite cotton knit-vinyl-tricot laminate is next fed to a suitable oven in which the cotton knit side of the laminate engages heated Teflon coated rolls whose temperature is held less than 240° F. while the napped nylon tricot side of the laminate engages similar Teflon coated rolls whose temperature is held between 340° F. and 350° F. The final laminated fabric is preferably fed at about seven yards per minute through the heat train.

As one example of the invention, the fabric was made with a 32 gauge, double bar, tricot nylon knit fabric. The front bar constituted 70 denier, 34 filament semi-dull Antron (Du Pont) nylon. The back bar constituted 15 denier, monofilament, semi-dull Antron nylon and the fabric exhibited a density of 52 wales per inch and 47 courses per inch and weight of 4.65 ounce per square yard. The fusion temperature of the first adhesive was selected as 340° F., the blowing agent was azobisformamide, the foam density was 25 pounds per cubic foot, the fusion temperature of the second adhesive was 260° F., and the parts plasticizer to resin was 110. The processing temperatures were held within the ranges previously described.

As a result of the choice of low fusion adhesive and of the fabric material and process conditions indicated the fabric of the invention has been achieved in contrast to what the practice of the art might have indicated. FIGURE 2 represents the final fabric product and as illustrated in FIGURE 1, it has been found desirable to subject the final laminated product to the steps of renapping and vacuuming. The final product can of course be made in a choice of color and in practice has been found to evidence all of the characterisics previously desired but heretofore unachieved, namely, dimensional stability, abrasive resistance, cleanability, waterproofness, high strength, and good hand as well as attractive feel and appearance. The fabric is furthermore particularly easy to tailor.

We claim:
1. An elongated laminated dimensionally stable and washable fabric suitable for upholstery pieces and the like, comprising:
   (a) a first surface sheet of plain knit cotton having a weight of substantially two and one-half ounces per square yard and having its wales running lengthwise of said fabric;
   (b) a second surface sheet of premetallized acid dyed tricot knit nylon having a weight of substantially five ounces per square yard, wales running lengthwise of said fabric, at least 70 percent ultimate elongation in its coursewise direction, one side napped and being heat set at between 390° F. and 400° F.;
   (c) a skin free closed cell vinyl foam core having a density of from 18 to 30 pounds per cubic foot;
   (d) a first plastisol adhesive permanently bonding one side of said cotton sheet to one side of said core and having a fusion temperature of between 300° F. and 350° F.; and
   (e) a second plastisol adhesive permanently bonding the unnapped side of said nylon sheet to the opposite side of said core and having a fusion temperature of between 250° F. and 280° F. and parts platicizer to parts resin in the range of 90 to 125.

References Cited

UNITED STATES PATENTS

| | | | |
|---|---|---|---|
| 3,216,068 | 11/1965 | Williams | 20—69 |
| 2,497,045 | 2/1950 | Killingsworth et al. | 260—33.6 |
| 3,028,279 | 4/1962 | Heberlein. | |
| 2,981,954 | 5/1961 | Gorbellano. | |

OTHER REFERENCES

Smith, W. M.: Vinyl Resins, 1961, pp. 116–117.

Mellon, I.: Industrial Plasticiziers, 1963, pp. 42–45.

ROBERT F. BURNETT, *Primary Examiner.*

ALEXANDER WYMAN, JACOB H. STEINBERG,
*Examiners.*

MARK A. LITMAN, *Assistant Examiner.*

UNITED STATES PATENT OFFICE
CERTIFICATE OF CORRECTION

Patent No. 3,385,750                      May 28, 1968

Kermit E. McCormack et al.

It is certified that error appears in the above identified patent and that said Letters Patent are hereby corrected as shown below:

Column 2, line 50, "foaming" should read -- forming --.
Column 3, line 13, "CCC-T-101-b" should read -- CCC-T-191-b --; line 34, "ounce" should read -- ounces --.

Signed and sealed this 18th day of November 1969.

(SEAL)
Attest:

Edward M. Fletcher, Jr.                    WILLIAM E. SCHUYLER, JR.
Attesting Officer                            Commissioner of Patents